United States Patent [19]

Webster et al.

[11] Patent Number: 4,881,892

[45] Date of Patent: Nov. 21, 1989

[54] APPARATUS FOR MAKING TAMPER-EVIDENT CLOSURES

[75] Inventors: Charles A. Webster, Oak Lawn; Christian J. John, Downers Grove, both of Ill.

[73] Assignee: American National Can Company, Chicago, Ill.

[21] Appl. No.: 255,822

[22] Filed: Oct. 11, 1988

[51] Int. Cl.$^4$ .......................................... B29C 45/34
[52] U.S. Cl. ...................................... 425/577; 249/52; 249/59; 425/812; 425/DIG. 58
[58] Field of Search ................ 249/52, 59, 63, 141, 249/144, 145, 184; 425/577, DIG. 58, 554, 556, 812, 207

[56] References Cited

U.S. PATENT DOCUMENTS 2,744,288  5/1956  Fienberg et al. ....................... 249/59
4,155,698  5/1979  Aichinger ................... 425/DIG. 58
4,552,328  11/1985 Dutt et al. ............................... 249/59
4,741,447  5/1988  John ....................................... 215/252

Primary Examiner—Jay H. Woo
Assistant Examiner—Timothy W. Heitbrink
Attorney, Agent, or Firm—Wallenstein Wagner & Hattis, Ltd.

[57] ABSTRACT

A mold for forming a plastic closure includes a first mold part defining a female cavity and a second mold part defining a male mold cavity surface, with the second mold part including a core having a knock-out pin reciprocated therein and surrounded by a fixed sleeve which cooperate to define a tamper-evident band on the cavity for the closure. Vents are provided for venting the lower edge of the cavity during the ejection-molding process. Also, the knock-out pin has a lubricant pocket formed on the peripheral surface thereof.

2 Claims, 3 Drawing Sheets

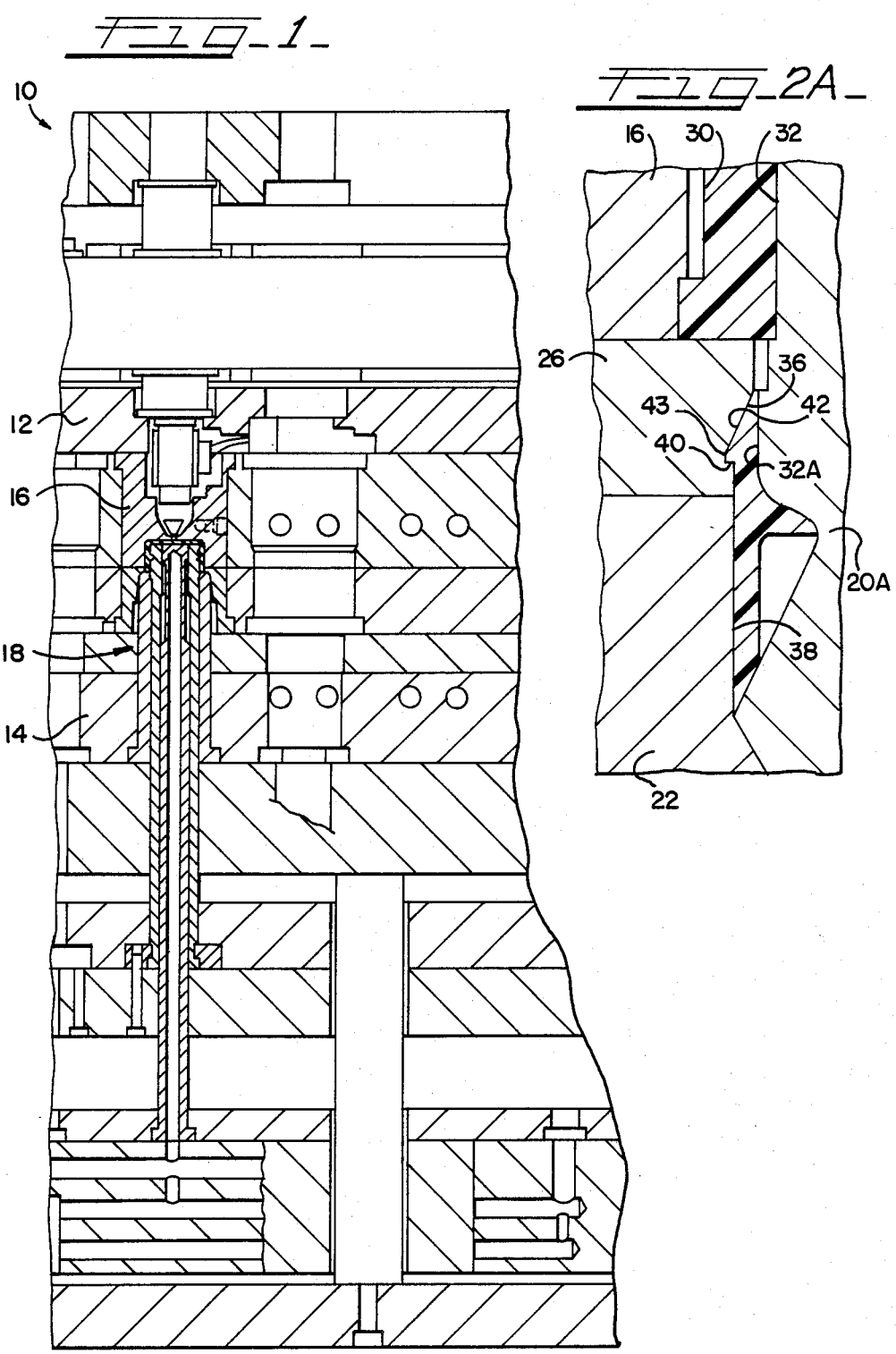

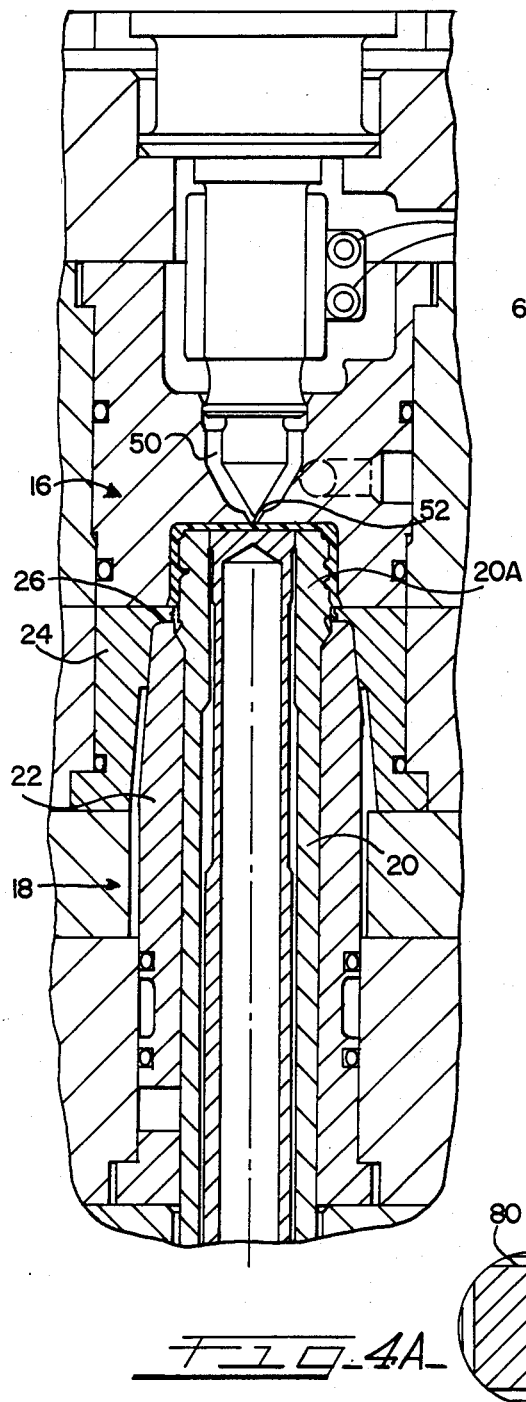

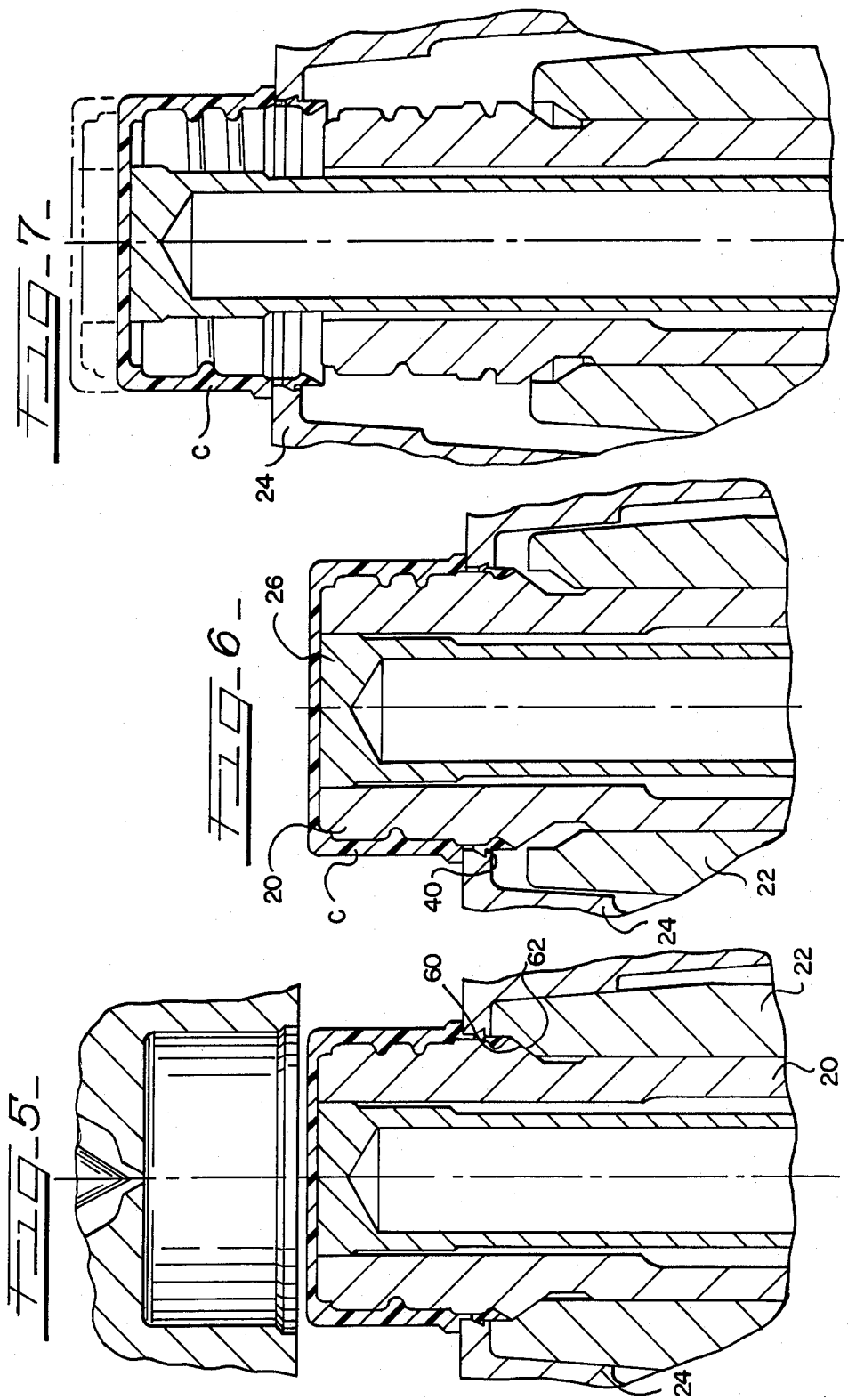

APPARATUS FOR MAKING TAMPER-EVIDENT CLOSURES

DESCRIPTION

1. Technical Field

The present invention relates generally to tamper-evident closures and, more particularly, to a method and apparatus for forming such closures.

2. Background Prior Art

Tamper-evident closures have become increasingly in demand for a wide variety of applications. One type of tamper-evident closure is disclosed in U.S. Pat. No. 4,741,447, which consists of a top circular wall that has a peripheral depending skirt that is internally threaded and cooperates with the thread on to the neck finish of a container. The tamper-evident feature consists of a band that is connected to the lower edge of the skirt through a plurality of frangible connections. The skirt or band has an internally-directed rib which cooperates with a shoulder formed on the neck finish during application of the closure to the container. Thus, upon removal of the closure, the frangible connections are severed and the band remains on the container.

These closures are normally formed in a one-step molding process in a mold that includes a female mold defining a cavity and a male mold received therein. The molten plastic is normally injected through the female mold to initially form the top wall of the closure and the molten plastic then flows down the sides of the male mold and ultimately forms the tamper-evident band. One type of mold for making the tamper-evident closure is disclosed in U.S. Pat. No. 4,552,328.

The mold disclosed in this patent consists of a hollow core which has an annular movable core ring supported on the upper end thereof which has its peripheral surface configured to define the inner surface of the closure. The mold disclosed therein also has an annular stripping ring that is positioned co-axially of the core element which has an inner surface that defines a portion of the exterior surface of the tamper-evident band. A center pin is axially movable within the core element and is utilized for removing the finished closure from the core ring.

One of the problems encountered in forming closures of the type discussed above is the ability to provide sufficient molten plastic material into the cavity portion that defines the band. It will be appreciated that for practical purposes all of the molten plastic must be injected through one port into the cavity. Since the selected location for injecting the molten plastic is usually determined by where the maximum amount of plastic is needed, it is generally necessary to inject the molten plastic through the upper surface of the cavity which forms the top wall of the closure. With the construction of the closure and tamper-evident band as described above, the molten plastic must flow through narrow confined spaced defining the frangible connection between the band and the skirt to form the tamper-evident band.

An additional problem is the fact that different plastic materials for forming different color closures have differing viscosity, which further increases the difficulty in getting sufficient molten plastic into the area of the band to form a proper band.

As indicated above, a center pin is reciprocated relative to the core element to remove the closure from the core element after formation thereof. It will be appreciated that since the upper surface of the center pin and the upper surface of the core element define a surface of the cavity, it is important that the tolerances are maintained very close in this area to prevent any molten plastic from entering the space therebetween. Furthermore, because of the construction of such devices, it is extremely difficult to provide lubricant onto the surfaces of the center pin and the core element. Thus, extensive wear, due to friction, results in the frequent replacement of the center pin or the core element.

SUMMARY OF THE INVENTION

According to the present invention, a mold for forming a closure that has a main body and a skirt with a tamper-evident band secured to the lower edge of the skirt by a plurality of frangible connections incorporates vent means for venting the lower edge of the cavity to thereby increase the integrity of the tamper-evident band.

More specifically, the mold consists of first and second mold portions that define a closure cavity that has an upper injection inlet means with vent means on the second mold portion for venting a lower edge of the closure cavity so that air in the cavity can be ejected while molten plastic is introduced into the cavity through the inlet means.

The second mold portion includes a movable core element with a knock-out pin reciprocated axially thereof and a surrounding stationary sleeve along with a stripper ring. The stripper ring, sleeve and core element are configured to define the lower edge of the cavity, which produces the tamper-evident band, and the vent means is defined on the movable core element.

More specifically, the core element has an upwardly-tapered portion directly below the lower edge of the cavity and an annular groove below the taper portion, with the taper portion having slots placing the lower edge of the cavity in communication with the annular groove. The periphery of the core element has further axially-extending circumferentially-spaced grooves that terminate at a location which is open to the atmosphere so that the air entrapped in the cavity during injection molding can be vented to atmosphere. If desired, a vacuum source could be applied to the vent means to positively evacuate the air from the cavity.

According to a further aspect of the invention, the knock-out pin also has lubricant pockets formed thereon, and these pockets are preferably circumferentially-spaced and extend axially so that the pockets are exposed when the knock-out pin is in the closure-ejection position.

BRIEF DESCRIPTION OF THE DRAWINGS

FIG. 1 is a fragmentary cross-sectional view of the molding apparatus having the present invention incorporated therein;

FIG. 2 is an enlarged fragmentary cross-sectional view similar to FIG. 1 showing further details of the invention;

FIG. 2A, appearing with FIG. 1, is a further enlarged fragmentary view of the mold cavity;

FIG. 3 is an enlarged fragmentary side view of the core element;

FIG. 4 is a fragmentary side elevational view of the knock-out punch;

FIG. 4A is a cross-sectional view, as viewed along line 4A—4A of FIG. 4; and,

FIGS. 5, 6 and 7 are cross-sectional views showing the manner of removing the finished closure from the mold.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

Referring now to FIG. 1, there is shown a closure-forming mold, generally designated by reference numeral 10, and consisting of an upper platen 12 and a lower platen 14, which are movable relative to each other. The upper mold platen supports a plurality of female mold elements 16, only one being shown, while the lower platen supports the male mold assembly, generally designated by reference numeral 18.

As shown in FIG. 2, the male mold assembly 18 consists of a core element 20 which is reciprocated within a fixed stripper sleeve 22 and has an upper exposed portion 20A which is received into the cavity in the female mold element 16. A stripper ring 24 has an inwardly-directed portion 26 at its upper end, for a purpose to be described later.

The female mold element 16 has a cavity formed therein which has a surrounding surface 30 that defines the outer surface of the closure cavity, while the upper end portion 20A of the core has an external surface 32 which defines the inner surface of the closure cavity, shown in FIG. 2A. The tamper-evident band is formed between the stripper ring 24, the sleeve 22 and the core 20. Thus, as shown in FIG. 2A, the inner surface 36 on the stripper ring defines the outer surface cavity for the upper portion of the tamper-evident band, as well as the inner surface of the cavity for the frangible tangs, while the outer surface 32A of the core defines the inner surface of the cavity. The lower portion of the band is formed between the inner surface 38 of the sleeve 20 and the outer surface 32 of the core. It should be noted that a shoulder 40 is formed on the inner surface 36 of the stripper ring and an inclined surface 42 extends from the shoulder, for a purpose to be described later. A flat band 43 interconnects the shoulder 40 with the inclined surface 42.

With the apparatus so far described, the mold elements are positioned, as shown in FIG. 2, and hot molten plastic is injected through an injection tip cavity 50 and a port 52. The molten plastic thus flows along the top portion of the cavity to produce the circular top wall and then flows down the annular portion to produce the skirt and ultimately flows through the narrow slots that define the tangs and then into the lower edge of the cavity to produce the tamper-evident band.

It will be appreciated that, during the flow of the hot molten plastic through the cavity, the plastic has a tendency to cool and therefore the viscosity thereof is increased. This increase in viscosity makes it difficult to fully form the tamper-evident band because of the limited space provided for the plastic to flow into the cavity area for producing the band. The viscosity of the molten plastic is, to a large degree, dependent upon the pigmentation that is utilized to add color to the closure. Thus, it has been found that the darker colors result in increased viscosity of the molten plastic and therefore make it more difficult to form the tamper-evident band.

According to the invention, the apparatus has been designed such that the integrity of the tamper-evident band is enhanced. This is accomplished by producing a vent means along the lower edge of the cavity below the area of the cavity, in which the band is formed. The vent means is formed as an integral part of the core, thereby minimizing the amount of modification of the mold structure.

As more clearly illustrated in FIG. 5, the sleeve 22 has a tapered surface 60 which cooperates with a tapered surface 62 formed on the core 20 which seals the lower edge of the cavity when the mold parts are in the position shown in FIG. 5.

According to the present invention, this area of the mold is provided with vent means for venting the lower edge of the cavity to enhance the flow of the molten plastic into the cavity area that defines the tamper-evident band.

As shown in FIG. 3, the tapered surface 62 has an upper portion 63 that is tapered slightly more than the taper of surface 60 to define a space. This space is in communication with an annular groove 64 through a plurality of circumferentially-spaced tapered slots 66. The core 20 also has a plurality of circumferentially-spaced recesses 68 extending axially thereof, with the upper edges of the recesses being in communication with the annular groove 64 and the lower edges of the recesses extending below the lower edge of the sleeve 22 to be vented to atmosphere.

Thus, the lower edge of the closure cavity is vented to atmosphere to allow any air that may be entrapped within the cavity, during the flow of molten plastic into the cavity, to be expelled. This results in enhancing the flow of the molten plastic into the band area of the cavity to increase the band integrity. To further enhance the flow of the molten plastic into the band area of the cavity, a vacuum may be applied to the lower edges of the recesses 68.

As indicated above, the top surface of the knock-out pin defines a portion of the cavity which produces the top circular wall of the closure. Also, the knock-out pin must be reciprocated within the core to remove the closure from the core. Thus, a minimum clearance must be provided between the knockout pin and the core to eliminate the possibility of any molten plastic flowing into the area. This results in excessive frictional wear between the knock-out pin and the core during the repeated reciprocal movement between the two. Thus, in the past, the knock-out pin has had limited life before re-machining or replacement thereof was required.

According to a further aspect of the invention, the knock-out pin is provided with a plurality of axially-extending, circumferentially spaced lubricant pockets.

As illustrated in FIG. 4A, the core pin 26 has a plurality of circumferentially-spaced, axially-extending pockets or recesses 80 that extend inwardly from the peripheral surface of the pin. The pockets are generally rectangular and have a reduced portion 82 at the upper ends thereof. In the illustrated embodiment, there are four such pockets equally spaced around the periphery of the pin 26. Thus, the pin can be extended above the upper edge of the core element 20 and lubricant can be introduced into each of the pockets. The lubricant will then be distributed around the entire periphery of the pin during reciprocal motion of the pin for ejecting finished closures, as will be described.

The operation of the mold is believed to be apparent from the above description, but will be briefly summarized, with particular reference to FIGS. 5, 6 and 7.

After the closure has been formed, the female mold is retracted so that the closure is exposed. The next step is to move the stripper 24 from the position shown in FIG. 5 to the position shown in FIG. 6. During this upward movement, the upper surface of the stripper 24 engages the lower edge of the closure, while the shoulder 40 engages a corresponding shoulder formed on the tamperevident band to prevent the tangs from tearing during removal of the tamper-evident band from the sleeve 22. Of course, during this movement, the core element 20 and the core pin 26 are simultaneously moved with the stripper ring so that the closure C remains on the core element.

Subsequently, the core element 20 is held stationary and the stripper 22 and the core pin 26 are simultaneously moved upward from the position shown in FIG. 6 to the position shown in FIG. 7, wherein the closure has been removed from the core element. The movement of the stripper 24 is then stopped while the motion of the core pin continues upwardly until the closure has been removed from the stripper ring and is ejected to a suitable location.

As can be appreciated from the above description, with only minor modification of the existing elements, significant advantages are derived therefrom which result in extended life of the molds without replacement of parts or interrupting the operation.

While the specific embodiments have been illustrated and described, numerous modifications come to mind without significantly departing from the spirit of the invention and the scope of protection is only limited by the scope of the accompanying claims.

We claim:

1. A mold for forming a closure including a main body having a skirt which has a tamper-evident band secured to a lower edge by a plurality of frangible connections comprising:

first and second mold portions cooperating to define a closure cavity, said first mold portion defining an outer surface of said closure;

said second mold portion defining an inner surface of said closure; and, said second mold portion including a hollow core having a knockout pin reciprocated therein and a sleeve surrounding said core, said sleeve and core having tapered portions adjacent said cavity and said core having an annular groove below said tapered portion with communication means between said annual groove and a lower edge of said cavity, said core having axially-extending recesses leading from said groove to accommodate air flow from said cavity.

2. A mold as defined in claim 1, in which an upper portion of the core has a taper which is greater than the taper on said sleeve to produce an annular gap which forms part of said communication means.

* * * * *